United States Patent Office 3,573,293
Patented Mar. 30, 1971

3,573,293
PHOSPHORODITHIOIC ACID ESTERS, THEIR SALTS AND THEIR PREPARATION
Herbert F. Wiese, Cleveland, Ohio, assignor to The Lubrizol Corporation, Wickliffe, Ohio
No Drawing. Division of application Ser. No. 498,107, Oct. 19, 1965, now Patent No. 3,361,668, dated Jan. 2, 1968. Continuation of application Ser. No. 598,957, Dec. 5, 1966. This application Mar. 4, 1969, Ser. No. 806,022
Int. Cl. C07f 9/16
U.S. Cl. 260—242       15 Claims

ABSTRACT OF THE DISCLOSURE

A process for preparing improved phosphorodithioic acid esters comprises incorporating up to about 5% by weight of an amine in a phosphorodithioic acid ester. The esters prepared by the process are less corrosive and lighter in color.

---

The invention of this application is a process for preparing very light colored, noncorrosive dihydrocarbyl substituted phosphorodithioic acids by reacting phosphorus pentasulfide with an alcohol or a phenol in the presence of a small amount of an aliphatic amine or a heterocyclic amine. Similarly light colored products may be obtained by adding a small amount of the above amine to a previously prepared phosphorodithioic acid. Light colored Group II metal salts are prepared by reacting the improved phosphorodithioic acid with a basically reacting Group II metal compound.

This application is a divisional application of copending application Ser. No. 498,107 filed Oct. 19, 1965 now U.S. Pat. No. 3,361,668 and a streamlined continuation of copending application Ser. No. 598,957, filed Dec. 5, 1966, now abandoned.

The zinc salts of O,O'-phosphorodithioic acid diesters have long been known to have useful properties as inhibitors of corrosion and oxidation. They are especially useful as additives for crankcase lubricants in internal combustion engines in which service they provide a means of combating deterioration of the oil and prevent corrosion of the relatively moving surfaces, particularly the bearing surfaces. Their use for such purposes is well established and their usefulness in this capacity has increased with the development and refinement of the modern internal combustion engine.

In normal practice, O,O'-phosphorodithioic acid diesters are manufactured by reacting about 4 equivalents of an organic monohydroxy compound, e.g., an alcohol or a phenol with one mole of phosphorus pentasulfide at temperatures of from about 50° C. to about 150° C. with the evolution of hydrogen sulfide as illustrated by the following equation:

$$4ROH + P_2S_5 \rightarrow 2(RO)_2PSSH + H_2S$$

The oil-soluble metal phosphorodithioate diester salts are usually manufactured by neutralizing the phosphorodithioic acid diester with a basically reacting metal compound, preferably the oxide, frequently with a small amount of water added, at temperatures of from about 50° to about 150° C.

A phosphorodithioic acid diester is usually assumed to have the structure shown in the above equation wherein the thiol group attached to the phosphorus atom accounts for its relatively strong acidic character. In addition, unless the alcohols used are anhydrous, traces of water which are present in the reaction mixture react with the phosphorus pentasulfide causing the formation of small amounts of monoesters of phosphorodithioic acid or phosphoromonothioic acid and even some unesterified phosphorus and sulfur containing acids, which may also contribute to their strongly acidic character. In any event, the commercially prepared phosphorodithioic acid diesters are sufficiently strong acids to be corrosive to metals and the use of special corrosion resistant equipment is generally required in their manufacture and storage. Therefore, the phosphorodithioic acid diesters usually are manufactured in stainless steel or glass lined steel equipment and it is standard practice to store them in stainless steel storage tanks.

The trend in recent years in lubricating oil manufacture has been toward producing lighter colored lubricants. This is because of a tendency among both manufacturers and the consuming public to associate the light color of a product with better performance. This is predicated on the fact that the products of lubricant deterioration and the precursors of sludge and varnish in a lubricating oil are usually dark in color. It follows that with the advent of lighter colored lubricating oil compositions, it is imperative that the additives which are incorporated into the oil should also be light in color so as not to darken or impart an "off" color to the lubricant composition.

An object of this invention, therefore, is to provide a process for preparing O,O'-diesters of phosphorodithioic acid which are less corrosive to metals.

Another object of this invention is to provide a process for preparing light colored O,O'-diesters of phosphorodithioic acid.

It is also an object of this invention to provide a process for preparing O,O'-diesters of phosphorodithioic acid which can be manufactured and handled in conventional process equipment.

Another object is to provide a process for preparing light colored metal salts of O,O'-diesters of phosphorodithioic acids.

Still another object of this invention is to provide a process for preparing light colored zinc salts of O,O'-diesters of phosphorodithioic acid.

It is still further an object to provide a process for preparing very light colored compositions which are suitable for use in lubricants intended for use at high temperatures.

These and other objects which will become apparent from the following disclosure are accomplished by a process for preparing improved O,O'diesters of phosphorodithioic acid comprising reacting at from about 20° C. to about 200° C., one mole of phosphorus pentasulfide with about 4 equivalents of a mixture of from about 95% to about 99.95% by wight of a monohydroxy organic compound selected from the class consisting of alcohols and phenols and from about 0.05% to about 5% by weight of an amine selected from the class consisting of alkyl amines, cycloalkyl amines and heterocyclic amines. These objects are also accomplished by a process for preparing improved O,O'-diesters of phosphorodithioic acid comprising reacting from about 95% to about 99.95% by weight of an O,O'-diester of phosphorodithioic acid with from about 0.05% to about 5% by weight of an amine selected from the class consisting of alkyl amines, cycloalkyl amines and heterocyclic amines.

Light colored phosphorodithioic acid diesters are obtained by the process of this invention in one of two ways. Either a small amount of a suitable amine is added to the alcohol before the alcohol is reacted with phosphorus pentasulfide or the phosphorodithioic acid diester is first prepared and a small amount of a suitable amine is then added. In either case, the product obtained is appreciably lighter in color than that made by prior art processes without the use of an amine.

It is preferred to mix the amine with the alcohol before reaction with phosphorus pentasulfide in order to take advantage of the reduced corrosiveness of the acid toward the processing equipment during the acid formation.

When the improved phosphorodithioic acid diesters are prepared by reacting a mixture of an alcohol or phenol and an amine with phosphorus pentasulfide, the mixture may contain from about 95% to 99.95% (by weight) of alcohol or phenol and from about 0.05% to 5% of the amine. The ratio of alcohol-amine mixture to phosphorus pentasulfide is about 4 equivalents per mole but an excess of the alcohol or phenol may be used as a solvent for the reaction or an excess of phosphorus pentasulfide may be used if it is desirable to completely consume the alcohol. In the latter case, the excess phosphorus pentasulfide is removed by suitable means such as filtering or centrifuging. Preferably, four equivalents of alcohol-amine mixture is reacted with about one mole or slightly more than one mole of phosphorus pentasulfide.

The number of equivalents of the alcohol-amine mixture is their combined number of equivalents. Since the alcohols or phenols preferred in the process are monohydric alcohols, the equivalent weight of such alcohol or phenol is its molecular weight. The equivalent weight of the amine is its molecular weight divided by the number of nitrogen atoms in the molecule. Thus, a monoamine has one equivalent per mole, a diamine has two equivalents per mole, a triamine has three equivalents per mole, etc.

The acid forming reaction is usually carried out by the slow, continuous addition of phosphorus pentasulfide or by the addition of small, discrete increments of phosphorus pentasulfide to the alcohol-amine mixture. The acid can also be manufactured in a continuous process such as that described in U.S. Pat. No. 2,862,947 wherein both alcohol and $P_2S_5$ are added continuously to a reaction zone and the acid product is continuously removed. Reaction may be effected at temperatures of from about 20° to about 200° C. The preferred temperature range is from about 60° C. to about 130° C.

When the previously manufactured phosphorodithioic acid diester is treated with an amine, about 0.05% to 5% by weight of the amine is reacted with the phosphorodithioic acid diester at temperatures of from about 20° to about 200° C.

Suitable monohydroxy organic compounds useful in the preparation of the improved O,O'-diesters of phosphorodithioic acid include alcohols, phenols, and alkyl phenols, including their substituted derivatives, e.g., nitro-, halo-, alkoxy-, hydroxy-, carboxy-, etc. Suitable alcohols include, for example, methanol, ethanol, n-propanol, isopropanol, n-butanol, 2-butanol, 2-methylpropanol, n-pentanol, 2-pentanol, 3-pentanol, 2-methylbutanol, 3-methyl-2-pentanol, n-hexanol, 2-hexanol, 3-hexanol, 2-methyl-2-pentanol, 4-methyl-3-pentanol, cyclohexanol, chlorocyclohexanol, methylcyclohexanol, heptanol, 2-ethylhexanol, n-octanol, 2,2-dimethyloctanol, nonanol, dodecanol, octadecanol, eicosanol, etc. The phenols suitable for the purposes of this invention include alkyl phenols and substituted phenols, e.g., phenol, chlorophenol, bromophenol, nitrophenol, methoxyphenol, cresol, propylphenol, butylphenol, amylphenol, heptylphenol, octylphenol, nonylphenol, octadecylphenol, etc. Ordinarily, the monohydroxy organic compounds suitable for purposes of this invention may have from 1 to about 30 carbon atoms.

In the interest of obtaining phosphorodithioic acid diesters whose metal salts have high phosphorus- and sulfur-content as well as being oil-soluble, a mixture of high molecular weight and low molecular weight alcohols may be used. The use of mixtures of alcohols also enables the utilization of cheaper alcohols which by themselves do not yield oil-soluble phosphorodithioate acid salts. Thus, a mixture of isopropyl and hexyl alcohols can be used to produce a very effective oil-soluble metal phosphorodithioate. For the same reason, mixtures of simple acids, i.e., acids prepared from single alcohols can be reacted with the metal neutralizing agent to produce less expensive, oil-soluble metal salts.

The amines suitable for use in this invention for preparing the improved phosphorodithioic acid diesters and their metal salts include the primary, secondary, and tertiary alkylamines and cycloalkylamines, having up to about 20 carbon atoms. Examples of such suitable amines include ethylamine, propylamine, isopropylamine, butylamine, isobutylamine, tertiary butylamine, n-pentylamine, isopentylamine, 3-methyl-2-butylamine, n-hexylamine, 2-methylpentylamine, 2-ethylbutylamine, 2,2-dimethylbutylamine, n-heptylamine, 2-methylhexylamine, 3-methylhexylamine, 2-ethylpentylamine, n-octylamine, 2-ethylhexylamine, 2,2-dimethyldodecylamine, dimethylamine, diethylamine, dipropylamine, diisopropylamine, dibutylamine, diisobutylamine, dipentylamine, di-2-methylpentylamine, diheptylamine, di-2-ethylhexylamine, diisooctylamine, didecylamine, trimethylamine, triethylamine, tripropylamine, tributylamine, benzylamine, furfurylamine, cyclohexylamine, dicyclohexylamine, etc.

Also useful for the purposes of this invention are the heterocyclic amines, that is, amines in which the amino nitrogen atom is a part of a ring made up of dissimilar atoms such as carbon, oxygen and sulfur as well as nitrogen. Examples of such heterocyclic amines include pyrrole, dihydropyrrole, pyrrolidine, oxazolidine, isoxazolidine, thiazolidine, oxazidine, piperidine, piperazine, morpholine, 4-(2-aminoethoxy)ethylmorpholine, 2-(4-morpholinylethoxy)ethanol, bis-2-(4-morpholinyl)ethyl ether, etc.

The improved metal salts of O,O'-diesters of phosphorodithioic acid of this invention are preferably salts of metals in Group II of the Periodic Table and comprise the salts of calcium, barium, strontium, zinc, and cadmium. The zinc and barium phosphorodithioate diesters are particularly effective as additives in lubricating compositions and are therefore preferred for use herein.

The preparation of metal salts of the phosphorodithioic acid diesters is well-known. They are prepared, for example, by the reaction of the acid with a metal neutralizing agent such as zinc, zinc oxide, or barium oxide. Simply mixing and heating these reactants is sufficient to cause the neutralization to take place and the resulting product is sufficiently pure for the purpose of this invention.

The following examples are illustrative of the process of preparing the improved phosphorodithioic acid diesters of this invention:

EXAMPLE 1

A mixture of 381 parts (2.93 equivalents) of isooctanol and 4 parts (0.028 equivalent) of a heterocyclic amine mixture consisting essentially of 4-(2-aminoethoxy)ethylmorpholine, 2-(4-morpholinylethoxy)ethanol, and bis-2-(4-morpholinyl)ethyl ether and having a nitrogen content of about 11% and an equivalent weight of about 142 is heated to 75° C. in one hour and 164 parts (0.74 mole) of phosphorus pentasulfide is added in one hour at 75–90° C. The reaction mixture is held at 90–100° C. for one hour and is filtered through a diatomaceous earth filter pad to obtain a clear, very light green liquid which is found to contain 17.37% sulfur, 8.05% phosphorus, 0.02% nitrogen.

EXAMPLE 2

The procedure of Example 1 is repeated except that the quantity of the amine mixture is 19.1 parts (0.134 equivalent) and the quantity of phosphorus pentasulfide is 170 parts (0.77 mole). The filtered product is found to contain 8.62% phosphorus, 17.09% sulfur, and 0.35% nitrogen.

EXAMPLE 3

A mixture of 1213 parts (16.4 equivalents) of isobutanol, 779 parts (8.83 equivalents) of primary amyl alcohol, and 95 parts (0.67 equivalent) of the amine used in Example 1 is heated to 70° C. and 1368 parts (6.17 moles) of phosphorus pentasulfide is added at 70-75° C. in 3 hours. The reaction mixture is heated for 1½ hours at 75-85° C. and filtered. The filtrate (3158 parts) is a clear, light green liquid containing 11.7% phosphorus, 24.8% sulfur, and 0.35% nitrogen.

EXAMPLE 4

A mixture of 96 parts (1.3 equivalents) of isobutanol, 61.6 parts (0.70 equivalent) of a primary amyl alcohol, 1.6 parts (0.011 equivalent) of the amine used in Example 1 is heated to 70° C. and 111 parts (0.5 mole) of phosphorus pentasulfide is added at 70-75° C. in one hour. The reaction mixture is heated an additional hour at 75-85° C. and then filtered. The filtrate is the product.

EXAMPLE 5

The process of Example 1 is repeated except that the quantity of iso-octanol used is 398 parts (3.06 equivalents), the quantity of amine used is 2 grams (0.014 equivalent), and the quantity of phosphorus pentasulfide is 171 parts (0.77 mole).

EXAMPLE 6

A mixture of 204 parts (2 equivalents) of 3-methyl-2-pentanol and 2 parts (0.023 equivalent) of amylamine is heated to 80° C. and 111 parts (0.5 mole) of phosphorus pentasulfide is added at 80-85° C. in one hour. The reaction mixture is heated for one hour at 90-95° C. and filtered. The filtrate is the product.

EXAMPLE 7

To a mixture of 500 parts (2.6 equivalents) of heptylphenol and 25 parts (0.135 equivalent) of dodecylamine is added 155 parts (0.7 mole) of phosphorus pentasulfide at 75-85° C. in one hour. The reaction mixture is heated one hour at 100-105° C. and filtered. The filtrate is the product.

EXAMPLE 8

A mixture of 245 parts (2.4 equivalents) of 3-methyl-2-pentanol, 96 parts (1.6 equivalents) of isopropanol, and 3.4 parts (0.034 equivalent) of cyclohexylamine is heated to 70° C. and 222 parts (1.0 mole) of phosphorus pentasufide is added in one hour. The mixture is held at 80-90° C. for one hour and filtered. The filtrate is the product.

EXAMPLE 9

Phosphorus pentasulfide, 112 parts (0.5 mole) is added to a mixture of 288 parts (2 equivalents) of nonyl alcohol and 2.9 parts (0.029 equivalent) of dipropylamine at 75-85° C. in one hour and the reaction mixture is heated for one hour at 75-85° C. before filtration.

EXAMPLE 10

To 355 parts (1 equivalent) of diisooctyl phosphorodithioic acid, 3.6 parts (0.025 equivalent) of the amine mixture defined in Example 1 is added with stirring at 55° C. and held at 50-55° C. for 3 hours. The product is a clear, light green liquid.

EXAMPLE 11

Amylamine, 3.6 parts (0.04 equivalent) is added to diisooctyl phosphorodithioic acid, 355 parts (1 equivalent) at 24° C. The mixture is heated to 50° C. and held at that temperature for 3 hours. The product is a clear, light green liquid.

EXAMPLE 12

The amine mixture defined in Example 1, 2.5 parts (0.018 equivalent) is added at ambient temperature to 252 parts (1 equivalent) of a dialkylphosphorodithioic acid made from a 65 mole percent isobutyl alcohol-35 mole percent primary amyl alcohol mixture. The mixture is heated to 50° C. and held at this temperature for 3 hours. The product is a clear, greenish liquid.

EXAMPLE 13

Amylamine, 2.5 parts (0.029 equivalent) is added to 252 parts (1 equivalent) of the dialkylphosphorodithioic acid used in Example 12 at 24° C. The mixture is heated to 50° C. and held at that temperature for 3 hours. The product is a greenish, clear liquid.

EXAMPLE 14

To 298 parts (1.0 equivalent) of di-4-methyl-2-pentyl phosphorodithioic acid, 3 parts (0.03 equivalent) of dipropylamine is added at 24° C. The mixture is heated to 50° C. and held at that temperature for 3 hours. The product is a clear, greenish liquid.

EXAMPLE 15

N-2-aminoethylpiperazine, 1.9 parts (0.015 equivalent) is added to diheptylphenyl phosphorodithioic acid, 379 parts (1 equivalent) at 24° C. The mixture is heated to and held at 50-55° C. for 3 hours. The product is a clear, light brown colored liquid.

EXAMPLE 16

To 355 parts (1 equivalent) of diisooctyl phosphorodithioic acid, 17.75 parts (0.125 equivalent) of the amine mixture defined in Example 1 is added with stirring at 55° C. and the mixture is held at 50-55° C. for 3 hours. The product is a clear, light green liquid.

EXAMPLE 17

To 355 parts (1 equivalent) of diisooctyl phosphorodithioic acid is added with stirring 17.75 parts (0.2 equivalent) of amylamine at 24° C. The mixture is heated to 50° C. and held at 50-55° C. for 3 hours. The product is a clear, light green liquid.

The following examples show preferred methods of preparing the improved Group II metal salts of O,O′-phosphorodithioc acid diesters:

EXAMPLE A

An improved zinc phosphorodithioate diester of this invention is prepared by adding 366 parts (1 equivalent) of the improved phosphorodithioic acid diester of Example 1 in one hour, without heating, to 44.7 parts (1.1 equivalents) of zinc oxide in 65 parts of a paraffin oil having a viscosity of 100° SUS at 100° F., with an exothermic temperature rise to 35° C., heating to 50° C. in one-half hour and holding at 50° C. for one hour. The reaction mixture is heated to 75° C. in 2 hours under vacuum with a pressure drop of from 160 to 125 millimeters and then at 125 millimeters to 120 millimeters while heating to 100° C. in an additional 1.25 hours. The product is filtered with the use of a diatomaceous earth filter aid to yield a clear, bright, light yellow liquid having the following analysis: 6.75% phosphorus, 13.70% sulfur, 7.54% zinc and 0.01% nitrogen.

EXAMPLE B

The process of Example A is repeated using 422 parts (1.0 equivalent) of the phosphorodithioic acid diester of Example 2, 44.7 parts (1.1 equivalents) of zinc oxide in 69 parts of oil. The filtered product is a clear, bright, amber liquid having the following analysis: 6.82% phosphorus, 13.87% sulfur, 6.67% zinc, and 0.31% nitrogen.

EXAMPLE C

An improved zinc phosphorodithioate diester is prepared by adding 1192 parts (4.0 equivalents) of the phosphorodithioic acid diester of Example 3 in 3.34 hours, without heating, to 178 parts (4.4 equivalents) of zinc oxide suspended in 204 grams of the oil used in Example A. The temperature rose exothermically from 25° to 50° C. The reaction mixture is held at 50° C. for one hour, heated from 50° to 73° C. in one hour under vacuum with the pressure dropping from 160 to 125 millimeters, and then at 125 to 120 millimeters while heating to 100° C.

in an additional 1.5 hours. The product is filtered with the use of a diatomaceous earth filter aid to yield a clear, bright, amber liquid having the following analyses: 9.14% phosphorus, 19.25% sulfur, 9.38% zinc and 0.32% nitrogen.

EXAMPLE D

The procedure of Example A is repeated using 252 parts (1 equivalent) of the phosphorodithioic acid diester of Example 4, 44.7 parts (1.1 equivalents) of zinc oxide and 65 parts of oil to obtain an improved zinc phosphorodithioate diester.

EXAMPLE E

The procedure of Example A is repeated using the phosphorodithioic acid diester of Example 6, 299 parts (1 equivalent), zinc oxide 44.7 parts (1.1 equivalents) and oil, 65 parts to obtain an improved zinc phosphorodithioate diester.

EXAMPLE F

The procedure of Example A is repeated using 378 parts (1 equivalent) of the phosphorodithioic acid prepared in Example 7, 44.7 parts (1.1 quivalents) of zinc oxide and 65 parts of oil to obtain an improved zinc phosphorodithioate diester.

EXAMPLE G

A phosphorodithioic acid ester is prepared according to the procedure of Example 1 using 577 parts (4 equivalents) of nonyl alcohol, 58 parts (0.41 equivalent) of the amine used in Example 1 and 244 parts (1.1 mole) of phosphorus pentasulfide. The procedure of Example A is repeated using 383 parts (1 equivalent) of this phosphorodithioic acid, 44.7 parts (1.1 equivalents) of zinc oxide and 65 parts of oil to obtain an improved zinc phosphorodithioate diester of this invention.

EXAMPLE H

The procedure of Example A is repeated using 355 parts (1 equivalent) of the phosphorodithioic acid diester of Example 5, 84.4 parts (1.1 equivalents) of barium oxide and 65 parts of oil to obtain an improved barium phosphorodithioate diester of this invention.

EXAMPLE I

The procedure of Example A is repeated using 383 parts (1 equivalent) of the phosphorodithioic acid diester of Example 9, 84.4 parts (1.1 equivalents) of barium oxide and 65 parts of oil to obtain an improved barium phosphorodithioate diester.

EXAMPLE J

The procedure of Example A is repeated using 253 parts (1 equivalent) of the phosphorodithioic acid diester of Example 8, 84.4 parts (1.1 equivalents) of barium oxide and 65 parts of oil to obtain an improved barium phosphorodithioate diester.

The corrosiveness of the phosphorodithioic acid diesters of this invention is shown to be reduced when compared with conventionally prepared diesters by the following test in which the attack upon mild steel is determined in a static corrosion test. The test involves immersing a sample of mild steel of known area in the solution to be tested for a given period of time at a given temperature. The weight loss of the sample is determined and the corrosion rate in inches per year is then calculated. Table I shows the results of such a test:

TABLE I

| Solution tested | Temperature | Corrosion rate (inches per year) |
|---|---|---|
| The product of Example 2 | Room temperature | 0.0017 |
| 100% diisooctylphosphorodithioic acid | do | 0.0384 |

The improved color of the phosphorodithioate diesters of this invention when compared with conventionally prepared phosphorodithioate diesters is shown in Table II in which the color of the liquids tested is determined according to ASTM procedure, D1500 in which a 0 rating indicates a colorless liquid and a higher number indicates a more highly colored material.

TABLE II

| Solution tested: | Color |
|---|---|
| Product of Example 10 | 5.5 |
| Product of Example 11 | 5.5 |
| Product of Example 16 | 5.5 |
| Product of Example 17 | 4.5 |
| Diisooctylphosphorodithioic acid | 7.0 |

The Group II metal salts of the improved O,O'-phosphorodithioic acid diesters prepared by the novel process herein previously described have utility as inhibitors against oxidation and corrosion in lubricating oils for internal combustion engines. However, it should be understood that the improved materials made by the process of this invention can be used for a variety of purposes such as, for example, in gear oils, torque-converter oils, turbine oils, turbo-jet oils, cutting oils, greases, hydraulic oils, flotation agents, plasticizers, etc.

Other modes of applying the principle of the invention may be employed, change being made as regards the details described, provided the features stated in any of the following claims, or the equivalent of such, be employed.

What is claimed is:

1. The process of preparing improved O,O'-diesters of phosphorodithioic acid comprising reacting at from about 20° C. to about 200° C.
   (A) one mole of phosphorus pentasulfide with
   (B) about 4 equivalents of a mixture of
      (1) from about 95% to about 99.95% by weight of a monohydroxy organic compound having up to about 30 carbon atoms and selected from the class consisting of alkanols, phenol, alkylphenols, and the nitro-, halo-, alkoxy-, and carboxy-substituted derivatives thereof, and
      (2) from about 0.05% to about 5% by weight of an alkylamine or a cycloalkylamine having up to about 20 carbon atoms or a heterocyclic amine selected from the class consisting of pyrrole, dihydropyrrole, pyrrolidine, oxazolidine, isoxazolidine, thiazolidine, oxazidine, piperidine, piperazine, morpholine, 4-(2-aminoethoxy)-ethylmorpholine, 2-(4-morpholinylethoxy)-ethanol, and bis-2-(4-morpholinyl)ethyl ether.

2. The process of claim 1 wherein components (B)(1) is a primary aliphatic alcohol.

3. The process of claim 1 wherein component (B)(1) is a mixture of lower molecular weight, primary aliphatic alcohols having fewer than 5 carbon atoms and higher molecular weight, primary aliphatic alcohols having at least 5 carbon atoms, the mole ratio of lower molecular weight alcohols to higher molecular weight alcohols being within the range of from 1:1 to 3:1.

4. The process of claim 1 wherein component (B)(1) is a phenol.

5. The process of claim 1 wherein component (B)(2) is a heterocyclic amine.

6. The process of claim 1 wherein component (B)(2) is a mixture of heterocyclic amines consisting essentially of 4-(2-aminoethoxy)ethylmorpoholine, 2-(4-morpholinylethoxy)ethanol, and bis-2-(4-morpholinyl)ethyl ether, said amine mixture having a nitrogen content of about 11%.

7. The process of claim 1 wherein components (B)(1) is a primary aliphatic alcohol and component (B)(2) is a mixture of heterocyclic amines consisting essentially of 4-(2-aminoethoxy)ethylmorpholine, 2 - (4 - morpholinylethoxy)ethanol, and bis-2-(4-morpholinyl)ethyl ether, said amine mixture having a nitrogen content of about 11%.

8. The product of the process of claim 1.

9. The product of the process of claim 7.

10. The process of preparing improved O,O'-diesters of phosphorodithioic acid comprising reacting at a temperature of from about 20° C. to about 200° C.
   (A) from about 95% to about 99.95% by weight of an O,O'-diester of phosphorodithioic acid in which each ester group is an aliphatic hydrocarbon with
   (B) from about 0.05% to about 5% by weight of an alkylamine or a cycloalkylamine having up to about 20 carbon atoms or a heterocyclic amine selected from the class consisting of pyrrole, dihydropyrrole, pyrrolidine, oxazolidine, isoxazolidine, thiazolidine, oxazidine, piperidine, piperazine, morpholine, 4-(2-aminoethoxy)ethylmorpholine, 2-(4-morpholinylethoxy)ethanol, and bis-2-(4-morpholinyl)ethyl ether.

11. The process of claim 10 wherein component (B) is a mixture of heterocyclic amines consisting essentially of 4-(2-aminoethoxy)ethylmorpholine, 2-(4-morpholinylethoxy)ethanol, and bis-2-(4 - morpholinyl)ethyl ether, said amine mixture having a nitrogen content of about 11%.

12. The product of the process of claim 10.

13. The product of the process of claim 11.

14. A metal salt of an O,O'-diester of phosphorodithioic acid of claim 12 prepared by the process of reacting said acid with about an equivalent amount of a basically reacting Group II metal compound.

15. The metal salt of claim 14 wherein said metal is zinc.

References Cited
UNITED STATES PATENTS

| | | | |
|---|---|---|---|
| 2,063,629 | 12/1936 | Salzberg et al. | 260—925 |
| 2,540,084 | 2/1951 | Asseff | 260—429.9 |
| 3,290,246 | 12/1966 | Perrotti et al. | 260—429.9 |
| 3,351,647 | 11/1967 | Butler et al. | 260—924 |

HENRY R. JILES, Primary Examiner

R. T. BOND, Assistant Examiner

U.S. Cl. X.R.

252—389, 400; 260—925, 429.9, 247.1, 268, 246, 306.7, 307, 326.82, 244, 293.4